United States Patent
Iijima

(10) Patent No.: US 10,948,899 B2
(45) Date of Patent: Mar. 16, 2021

(54) MOTOR CONTROLLER THAT USES AN ACCELERATION/DECELERATION TIME CONSTANT OF THE MOTOR

(71) Applicant: FANUC CORPORATION, Yamanashi (JP)

(72) Inventor: Kazunori Iijima, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 215 days.

(21) Appl. No.: 16/004,686

(22) Filed: Jun. 11, 2018

(65) Prior Publication Data

US 2018/0364683 A1 Dec. 20, 2018

(30) Foreign Application Priority Data

Jun. 14, 2017 (JP) .............................. JP2017-116582

(51) Int. Cl.
*G05B 19/41* (2006.01)
*H02P 23/14* (2006.01)
(Continued)

(52) U.S. Cl.
CPC ........... *G05B 19/416* (2013.01); *B41J 19/202* (2013.01); *B41J 29/38* (2013.01);
(Continued)

(58) Field of Classification Search
None
See application file for complete search history.

(56) References Cited

U.S. PATENT DOCUMENTS 3,539,889 A * 11/1970 Burch ..................... B60L 15/20
318/143
4,922,169 A * 5/1990 Freeman ................. H02P 6/182
318/400.1
(Continued)

FOREIGN PATENT DOCUMENTS

CN 1448815 10/2003
CN 102640066 8/2012
(Continued)

OTHER PUBLICATIONS

Doss, A.N.; Kalyanasundaram, V.; Ganapathy, V. and Karthik, K.., "A Cost Effective Speed Control Method for BLDC Motor Drive", 2016, IJCTA, 9(33), pp. 01-10, International Science Press. (Year:2016).*

(Continued)

*Primary Examiner* — Mohammad Ali
*Assistant Examiner* — Kelvin Booker
(74) *Attorney, Agent, or Firm* — Wenderoth, Lind & Ponack, L.L.P.

(57) ABSTRACT

A controller of a motor includes: an acceleration/deceleration time constant storing unit that stores an acceleration/deceleration time constant; a position command creating unit that creates a position command value based on the acceleration/deceleration time constant; a position detection unit that detects a rotation position of the motor; a speed command creating unit that creates a speed command for the motor on the basis of the position command value and a position detection value detected by the position detection unit; an ideal response computing unit that computes an ideal response from the position command value; and a response comparing unit that compares the ideal response with an actual response detected by the position detection unit. The response comparing unit changes the acceleration/deceleration time constant stored in the acceleration/decel- (Continued)

eration time constant storing unit when it is determined that the ideal response does not match the actual response.

3 Claims, 5 Drawing Sheets

(51) Int. Cl.
*H02P 6/22* (2006.01)
*B41J 29/38* (2006.01)
*G05B 19/416* (2006.01)
*B41J 19/20* (2006.01)

(52) U.S. Cl.
CPC .......... *G05B 2219/37388* (2013.01); *G05B 2219/43006* (2013.01); *H02P 6/22* (2013.01); *H02P 23/14* (2013.01)

(56) References Cited

U.S. PATENT DOCUMENTS

| | | | | |
|---|---|---|---|---|
| 5,433,541 | A * | 7/1995 | Hieda | B41J 19/202 400/279 |
| 6,515,442 | B1 * | 2/2003 | Okubo | G05B 19/19 318/560 |
| 8,855,888 | B2 * | 10/2014 | Suzuki | F02D 29/00 701/99 |
| 2002/0185926 | A1 * | 12/2002 | King | H02P 6/182 310/68 B |
| 2006/0208722 | A1 * | 9/2006 | Takemasa | B60R 1/072 324/200 |
| 2008/0048598 | A1 * | 2/2008 | Shibuya | H02P 6/185 318/400.1 |
| 2008/0231217 | A1 * | 9/2008 | Zhong | H02P 6/181 318/400.07 |
| 2008/0281480 | A1 * | 11/2008 | Egami | B60K 6/445 701/22 |
| 2010/0245450 | A1 * | 9/2010 | Iesaki | B41J 29/38 347/16 |
| 2011/0109255 | A1 * | 5/2011 | Bonvin | H02P 6/185 318/400.33 |
| 2011/0169442 | A1 * | 7/2011 | Birumachi | H02P 8/34 318/696 |
| 2011/0279070 | A1 * | 11/2011 | Tanaka | H02P 6/188 318/400.1 |
| 2012/0245773 | A1 * | 9/2012 | Suzuki | B60L 15/20 701/22 |
| 2014/0021895 | A1 * | 1/2014 | Ohgushi | H02P 6/14 318/400.26 |
| 2014/0210385 | A1 * | 7/2014 | Kozaki | F16O 32/0457 318/400.02 |
| 2014/0217951 | A1 * | 8/2014 | Sugihara | G05B 19/19 318/600 |
| 2014/0232311 | A1 * | 8/2014 | Hill | H02P 6/185 318/400.33 |
| 2015/0198934 | A1 * | 7/2015 | Kaku | G05B 13/047 318/561 |
| 2015/0280631 | A1 * | 10/2015 | Osamura | H02P 23/14 318/461 |
| 2018/0120820 | A1 * | 5/2018 | Ueda | H02P 29/20 |
| 2019/0379308 | A1 * | 12/2019 | Forsberg | H02P 6/17 |

FOREIGN PATENT DOCUMENTS

| | | |
|---|---|---|
| CN | 105811817 | 7/2016 |
| CN | 105814503 | 7/2016 |
| CN | 106489105 | 3/2017 |
| JP | 9-16233 | 1/1997 |
| JP | 2002-46042 | 2/2002 |
| JP | 2002-186269 | 6/2002 |
| JP | 2003-148600 | 5/2003 |
| JP | 2005-6418 | 1/2005 |
| JP | 2005-304120 | 10/2005 |
| JP | 2007-141189 | 6/2007 |
| JP | 2010-148178 | 7/2010 |
| JP | 2011-134169 | 7/2011 |
| JP | 6113378 | 4/2017 |
| WO | 2005/093939 | 10/2005 |
| WO | 2015/087455 | 6/2015 |

OTHER PUBLICATIONS

Natvarlal, H.A., "Speed Control of Brushless DC Motor: A Review", 2015, American International Journal of Research in Science, Technology, Engineering & Mathematics, ISSN (Print): 2328-3491, ISSN (Online): 2328-3580, ISSN (CD-ROM): 2328-3629. (Year:2015).*

Ozgenel, M.C.; Bal, G. and Uygun, D., "Design and application of a novel high precision and low cost electronic tachogenerator for sensor-based brushless direct current motor drivers", 2017, Review of Scientific Instruments 88, 035005. (Year:2017).*

Gamazo-Real, J.C.; Vazquez-Sanchez, E. and Gomez-Gil, J., "Position and Speed Control of Brushless DC Motors Using Sensorless Techniques and Application Trends", Jun. 2010, Sensors 2010, 10, 6901-6947; doi:10.3390/s100706901. (Year:2010).*

Office Action dated May 29, 2019 in Chinese Patent Application No. 201810600643.8.

Office Action dated Oct. 14, 2020 in DE Patent Application No. 102018209092.0.

* cited by examiner

MOTOR CONTROLLER THAT USES AN ACCELERATION/DECELERATION TIME CONSTANT OF THE MOTOR

This application is based on and claims the benefit of priority from Japanese Patent Application No. 2017-116582, filed on 14 Jun. 2017, the content of which is incorporated herein by reference.

BACKGROUND OF THE INVENTION

Field of the Invention

The present invention relates to a controller of a motor that drives a driven body.

Related Art

Conventionally, Patent Documents 1 to 4 disclose techniques related to a controller for controlling a motor to operate a driven body.

Patent Document 1 discloses a technique of gradually changing parameters until the difference between the command and the feedback becomes smaller than an allowable value in cases where the optimal value of the servo parameter has changed due to aging. In Patent Document 1, in cases where vibration is likely to occur in the actual response or where the tracking ability of the control is low, the acceleration is gradually reduced, and the time constant is increased until the positional deviation falls within an allowable range.

Patent Document 2 discloses a method of detecting acceleration using an acceleration detector and correcting the gain when the acceleration exceeds a certain threshold. In Patent Document 2, what is considered is whether the instantaneous value, the mean value, and the square mean value of the acceleration difference between the motor and the load structure is larger than a predetermined value or not. And the acceleration difference is obtained using an angular detection value of the motor and an acceleration detection value of the load structure.

Patent Document 3 discloses a technique with regards to a device and a method for setting control parameters of a motor controller wherein a gain table is stored and an optimal gain is read out according to machine rigidity. Patent Document 3 relates to a technique of changing the gain value of a PI controller of a servo system, and discloses a gain scheduling method where the gain is increased when the load inertia is large and is decreased when the load inertia is small.

Patent Document 4 discloses, as an inertia estimation method, a technique in which the inertia is computed from a representative current value and a representative acceleration value both obtained from current values and acceleration values in a plurality of periods of a sinusoidal command stored in a sampling data storing unit, along with a torque constant of a motor.

Patent Document 1: Japanese Unexamined Patent Application, Publication No. 2011-134169

Patent Document 2: Japanese Unexamined Patent Application, Publication No. 2007-141189

Patent Document 3: Japanese Unexamined Patent Application, Publication No. 2005-006418

Patent Document 4: Japanese Unexamined Patent Application, Publication No. 2010-148178

SUMMARY OF THE INVENTION

However, the operation of a driven body (work) operated by a motor is determined by the acceleration/deceleration time constant adjusted based on the maximum loading capacity of a machine tool. Although it differs depending on the load of the mechanism of the machine tool for moving the work or that of the targeted work to be machined and the like, from the perspective of efficiency, it is preferable to make the acceleration time as short as possible within the allowable range of the output torque. On the other hand, when the motor is operated with an extremely short acceleration time (acceleration/deceleration time constant), the position control of the motor may become unstable (vibration may occur).

The conventional techniques also disclose a method for adjusting acceleration/deceleration. For example, in Patent Document 1, when the tracking ability is low, the acceleration is gradually reduced and the time constant is increased until the positional deviation falls within an allowable range. However, the tracking ability is simply a matter of control performance, and it is undesirable to change the command trajectory which determines the operational shape in such a manner. Changing the time constant means changing the command shape, and there lies no intention of finding a physical operation that is really probable. In Patent Document 2, it is necessary to provide an additional detector such as an acceleration sensor in the load structure. In Patent Documents 3 and 4, no determination is made over whether the obtained acceleration is appropriate or not.

An object of the present invention is to provide a motor controller capable of determining whether an acceleration/deceleration time constant is in an appropriate range and of realizing both the improvement of machining efficiency and the securing of control stability.

(1) The present invention provides a controller (a controller 2 described later, for example) of a motor (a motor 10 described later, for example) that drives a driven body (a work W described later, for example), the controller including: an acceleration/deceleration time constant storing unit (an acceleration/deceleration time constant storing unit 41 described later, for example) that stores an acceleration/deceleration time constant that designates an acceleration/deceleration of the motor; a position command creating unit (a position command creating unit 42 described later, for example) that creates a position command value based on the acceleration/deceleration time constant; a position detection unit (a position detection unit 12 described later, for example) that detects a rotation position of the motor; a speed command creating unit (a speed command creating unit 43 described later, for example) that creates a speed command for the motor based on the position command value and a position detection value detected by the position detection unit; an ideal response computing unit (an ideal response computing unit 44 described later, for example) that computes an ideal response from the position command value with the aid of a low-pass filter (a low-pass filter 17 described later, for example); and a response comparing unit (a response comparing unit 45 described later, for example) that compares the ideal response with an actual response detected by the position detection unit, wherein the response comparing unit changes the acceleration/deceleration time constant stored in the acceleration/deceleration time constant storing unit when it is determined that the ideal response does not match the actual response.

(2) In the controller according to (1), the response comparing unit may estimate an inertia and change the acceleration/deceleration time constant on the basis of the estimated result.

(3) In the controller according to (1) or (2), the response comparing unit may compute integral values of values obtained by calculating an error in a time-series signal of the response, an absolute value thereof, or a square value thereof, and perform response comparison on the basis of an evaluation value obtained on the basis of the integral values or a combination thereof.

(4) In the controller according to (3), the response comparing unit may determine that the comparison result is a mismatch when the evaluation value exceeds a threshold set thereto.

According to the motor controller of the present invention, it is possible to determine whether an acceleration/deceleration time constant is in an appropriate range or not, and to realize both the improvement of machining efficiency and the securing of control stability.

DETAILED DESCRIPTION OF THE INVENTION

Hereinafter, a preferred embodiment of the present invention will be described with reference to the drawings.

Figure 1:
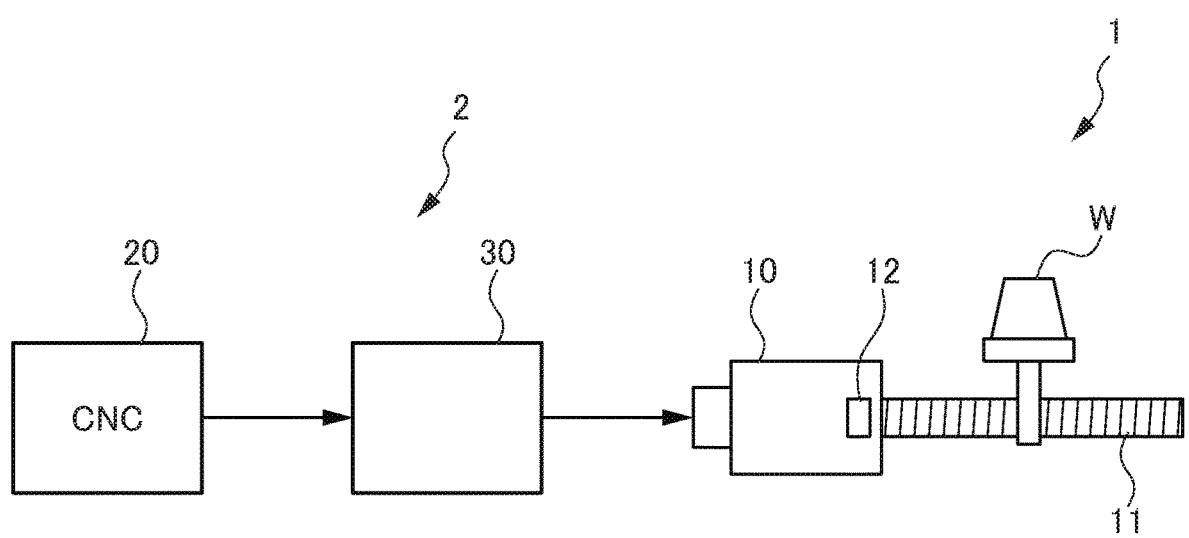
FIG. 1 is a diagram schematically illustrating a machine tool to which a controller according to an embodiment of the present invention is applied.

FIG. 1 is a diagram schematically illustrating a machine tool 1 to which a controller according to an embodiment of the present invention is applied. First, an example of a configuration of the machine tool 1 will be described. The machine tool 1 illustrated in FIG. 1 is a machining device that machines a work (a driven body) W into a desired shape.

The machine tool 1 of the present embodiment includes a controller 2 including a numerical controller 20 and a servo controller 30, a motor 10 controlled by the controller 2, and a feed shaft (a transmission mechanism) 11 that moves the work W using the driving force of the motor 10.

The numerical controller 20 is a computerized numerical control (CNC) and performs various processing of controlling the machine tool 1. The servo controller 30 controls the driving of the motor 10 based on commands from the numerical controller 20.

The motor 10 is a servomotor that applies driving force to the feed shaft 11. When the feed shaft 11 is driven, the work W which is a driven body moves to a predetermined position. A position detector 12 such as an encoder is attached to the motor 10, and a detection signal obtained by the position detector 12 is used for various processing such as feedback control.

Figure 2:
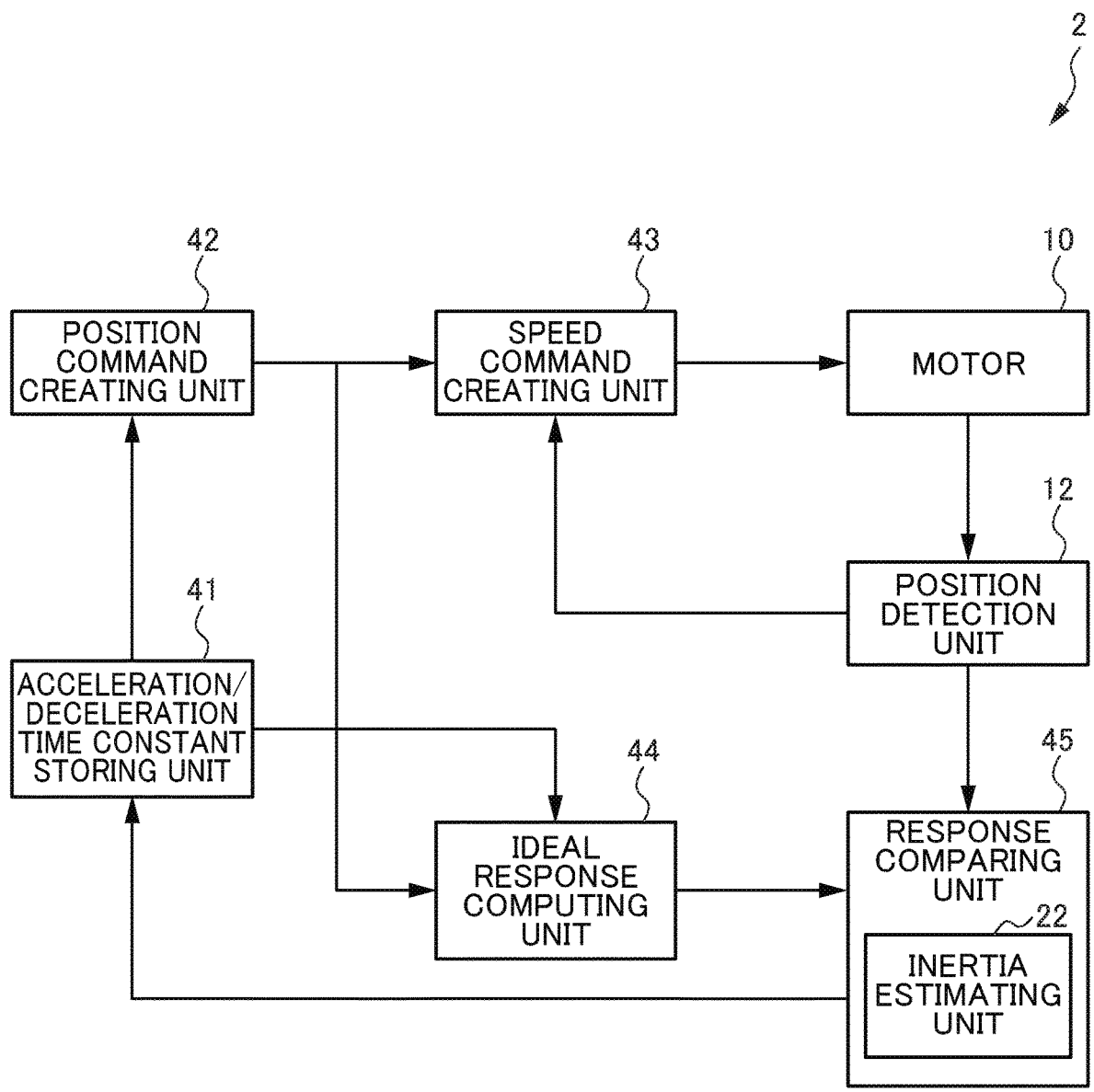
FIG. 2 is a block diagram illustrating a configuration related to servo control of the controller according to the present embodiment.

FIG. 2 is a block diagram illustrating a configuration related to servo control of the controller 2 according to the present embodiment. The respective units illustrated in FIG. 2 are realized by the numerical controller 20 or the servo controller 30, and the arrangement position thereof is not particularly limited. Such functions may be realized by the numerical controller 20, the servo controller 30, or an external device other than the numerical controller 20 and the servo controller 30.

As illustrated in FIG. 2, the controller 2 includes an acceleration/deceleration time constant storing unit 41, a position command creating unit 42, a speed command creating unit 43, an ideal response computing unit 44, a response comparing unit 45, and a position detection unit 12.

The acceleration/deceleration time constant storing unit 41 designates an acceleration/deceleration time constant associated with acceleration/deceleration of the motor 10. An acceleration/deceleration time constant determined based on an estimated inertia described later is stored in the acceleration/deceleration time constant storing unit 41 and is updated at appropriate timings. The position command creating unit 42 creates a position command value based on the acceleration/deceleration time constant. The speed command creating unit 43 creates a speed command of the motor 10 based on the position command value created by the position command creating unit 42 and the position detection value detected by the position detection unit 12.

Figure 3A:
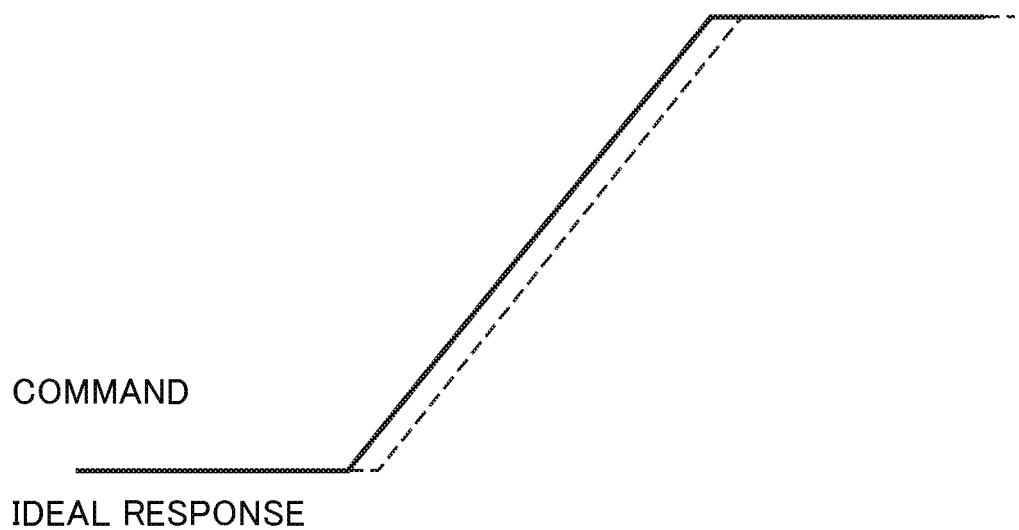
FIG. 3A is an explanatory diagram illustrating a relationship between a command (with a time constant) and an ideal response.
Figure 4A:
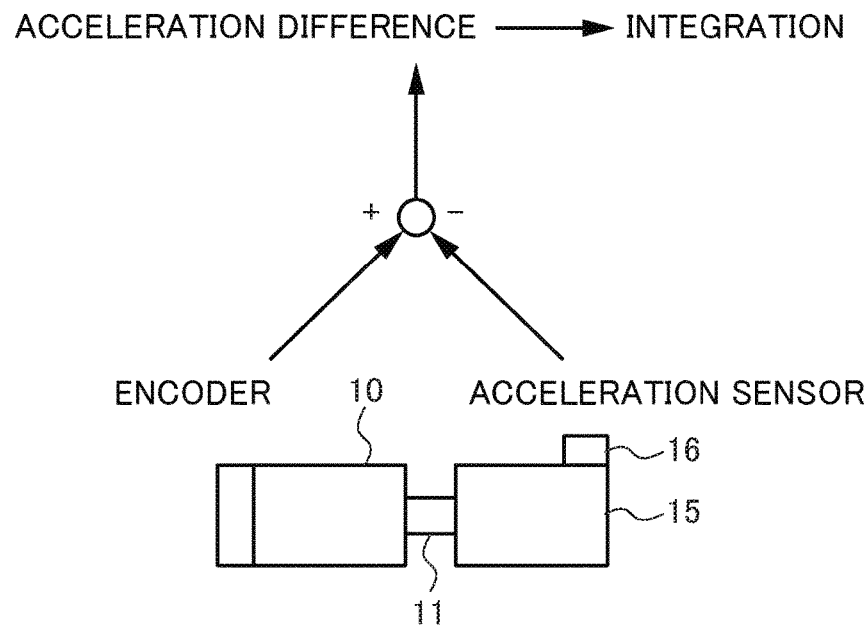
FIG. 4A is a schematic diagram illustrating the flow of a conventional integration processing as a comparative example.
Figure 4B:
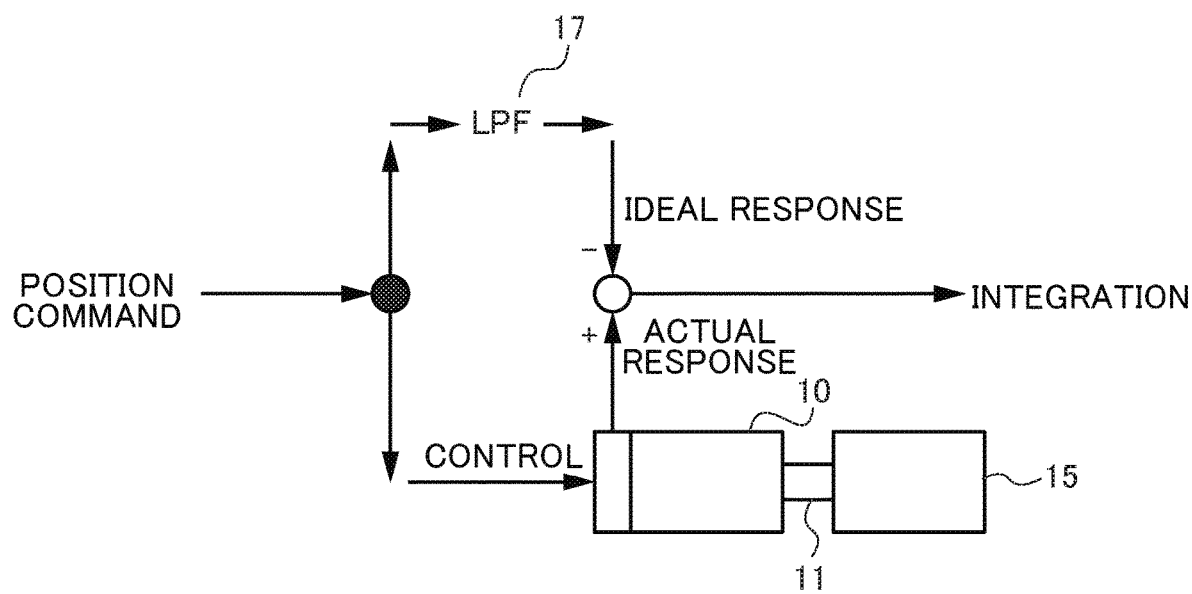
FIG. 4B is a schematic diagram illustrating the flow of an integration processing of the present embodiment.

The ideal response computing unit 44 computes an ideal response from the position command value with the aid of a low-pass filter 17 (see FIG. 4B). Next, a relationship between an ideal response and an actual response will be described. FIG. 3A is an explanatory diagram illustrating a relationship between a command (with a time constant) and an ideal response. An ideal response of servo control is a behavior of a primary delay and can be described by a low-pass filter. In other words, an ideal response is a response wherein a delay of a control system is added to a position command by a low-pass filter. On the other hand, the filter based on the acceleration/deceleration time constant in generation of commands on an upstream side is a moving average filter. Therefore, even if "the waveform of ideal response (output of low-pass filter)" and "the waveform of the command based on acceleration/deceleration (output of moving average filter)" are the same in a normal state, they are different in a transient state.

Figure 3B:
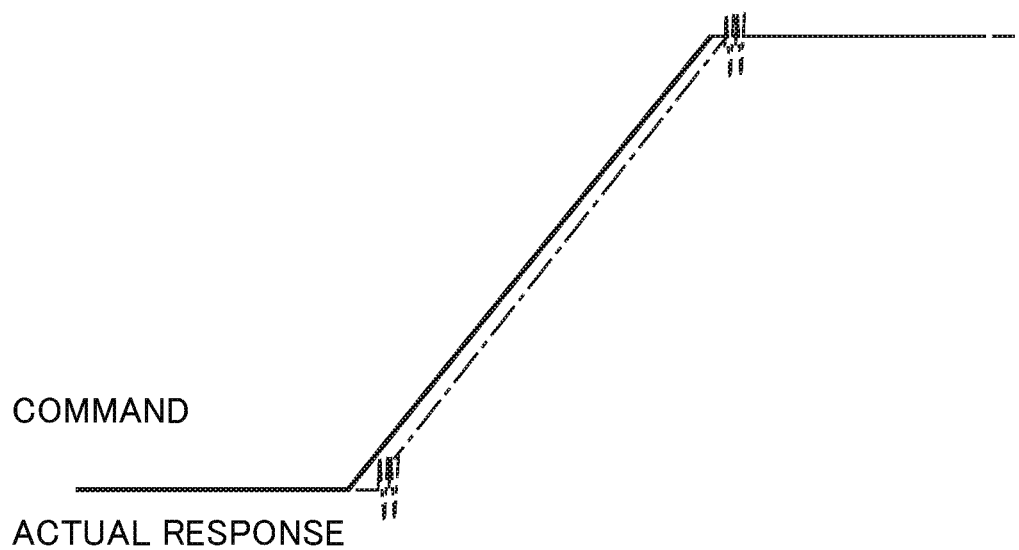
FIG. 3B is an explanatory diagram illustrating a relationship between a command and an actual response.

FIG. 3B is an explanatory diagram illustrating a relationship between a command and an actual response. As illustrated in FIG. 3B, when vibration is likely to occur in an actual response or when tracking ability of the control is low, in the conventional technology (for example, Patent Document 1), acceleration is gradually reduced and the time constant is increased until the positional deviation falls within an allowable range. However, the tracking ability is simply a matter of control performance, and changing the acceleration/deceleration time constant results in changing the command shape. It is undesirable to change the command trajectory which determines an operational shape in such a manner.

Therefore, in the present embodiment, it is determined whether an acceleration (an acceleration/deceleration time constant) obtained based on the inertia is appropriate or not by using the difference between an ideal response value and a detection value. Since the acceleration/deceleration time constant is determined according to an inertia value, the acceleration/deceleration time constant should originally be appropriate. In this case, the acceleration/deceleration time constant should be strictly identical to an ideal response of the low-pass filter 17 rather than that of a moving average filter. In this sense, the time integration of the sum of squares of "the difference between an ideal response value and a detection value" should be zero, and it is proven that the operation is identical to a physical operation which is really probable with regards to a designated command shape.

Next, the difference between a conventional integration processing and an integration processing of the present embodiment will be described. FIG. 4A is a schematic diagram illustrating the flow of a conventional integration processing as a comparative example. As illustrated in FIG. 4A, in the conventional technology (for example, Patent Document 2), what is considered is whether an instantaneous value, a mean value, or a square mean value of "an acceleration difference between a motor and a load structure" is larger than a predetermined value or not. The acceleration difference is obtained using an encoder (an angular detection value) of the motor 10 and the detection value of the acceleration sensor 16 of the load structure 15. In this configuration, it is necessary to provide the acceleration sensor 16.

FIG. 4B is a schematic diagram illustrating the flow of an integration processing of the present embodiment. As illustrated in FIG. 4B, in the present embodiment, an ideal response is acquired by the low-pass filter 17. The appropriateness of the acceleration is determined by calculating the time integration of the sum of squares of the "difference between ideal response value and detection value" from the perspective of examining whether or not an operation is identical to a physical operation which is really probable with regards to a designated command shape during a certain time period. Hence, a little overshoot resulting from modeling errors of a machine structure in a control system is allowable. The present embodiment is also different from the conventional technology in that the limit acceleration in the case where the machine structure can be regarded as an integrated structure is obtained based on an inertia estimation value of the load structure 15, and the load structure 15 does not require the acceleration sensor 16.

As described above, the ideal response computing unit 44 of the present embodiment acquires an ideal response with the aid of the low-pass filter 17. The response comparing unit 45 compares the ideal response acquired in this manner with an actual response. The actual response is acquired on the basis of the position detection value of the position detection unit 12.

The response comparing unit 45 of the present embodiment determines whether or not the ideal response and the actual response match each other on the basis of an evaluation value. The response comparing unit 45 computes integral values of values obtained by calculating an error in a time-series signal of the response, an absolute value thereof, or a square value thereof, and the evaluation value is obtained on the basis of the integral values or a combination thereof. A predetermined threshold is set for the evaluation value, and the criterion for determination becomes whether or not the evaluation value deviates from the threshold.

The response comparing unit 45 of the present embodiment has an inertia estimating unit 22 as a means for estimating the load or the inertia (the inertia moment) of the mechanism of the machine tool 1 and the work W, and the acceleration/deceleration time constant is adjusted based on the inertia estimated by the inertia estimating unit 22 (see FIG. 2).

The inertia estimating unit 22 estimates the inertia of the work W mounted in the machine tool 1 based on a feedback signal (feedback information) of the motor 10 acquired during a predetermined operation. The feedback signal of the motor 10 relates to torque, current, speed, and the like. For example, the inertia is calculated based on a speed feedback signal from the position detector 12 of the motor 10 or a current feedback signal from an amplifier (not illustrated) of the servo controller 30.

The inertia estimating unit 22 calculates the inertia based on a predetermined estimation equation. Equation (1) below can be used as the inertia estimation equation, for example. The inertia estimating unit 22 acquires variables such as current I, an angular acceleration w, and disturbance Tf as feedback signals to estimate inertia. The current feedback signal can be acquired as an effective current calculated using the phase information of the position detector 12. The angular acceleration w can be obtained by a differentiation of an angular speed, for example. The inertia estimation method is not limited to this method but can be changed appropriately.

$$Jw = (kt \cdot I - Tf)/\omega \qquad (1)$$

Jw: Inertia . . .
kt: Torque constant
I: Current
Tf: Disturbance (Friction or the like)
ω: Angular acceleration A processing of optimally adjusting the time constant of acceleration/deceleration based on the inertia which came from the estimation (hereinafter, estimated inertia) is performed. Although the output torque to be generated by the motor 10 differs depending on the load of the mechanism of the machine tool 1 for moving the work W or that of the targeted work W to be machined and the like, it is preferable that the acceleration time is as short as possible within the allowable range of the output torque. On the other hand, when the motor is operated with an extremely short acceleration time (an acceleration/deceleration time constant), the position control of the motor may become unstable (vibration may occur). For example, when the acceleration/deceleration time constant is set to be shorter than the appropriate value with regards to the performance of the motor 10 and the inertia of the work W, due to the restriction of the performance of the motor 10, it may not be possible to perform acceleration/deceleration as commanded and the output torque may saturate with regards to the command torque, and thus, proper control may be inhibited. In contrast, when the acceleration/deceleration time constant is set to be longer than the appropriate value, the acceleration/deceleration is performed slower than it is necessary, resulting in reduced efficiency. Therefore, the acceleration/deceleration time constant is adjusted optimally on the basis of estimated inertia.

As for the process of optimizing the acceleration/deceleration time constant, for example, an optimal time constant for inertia is obtained in advance, theoretically or experimentally, and the optimal time constant is set based on the inertia which came from the estimation. The optimal time constant may be selected from predetermined values, or may be calculated sequentially; an appropriate method may be employed.

Figure 5:
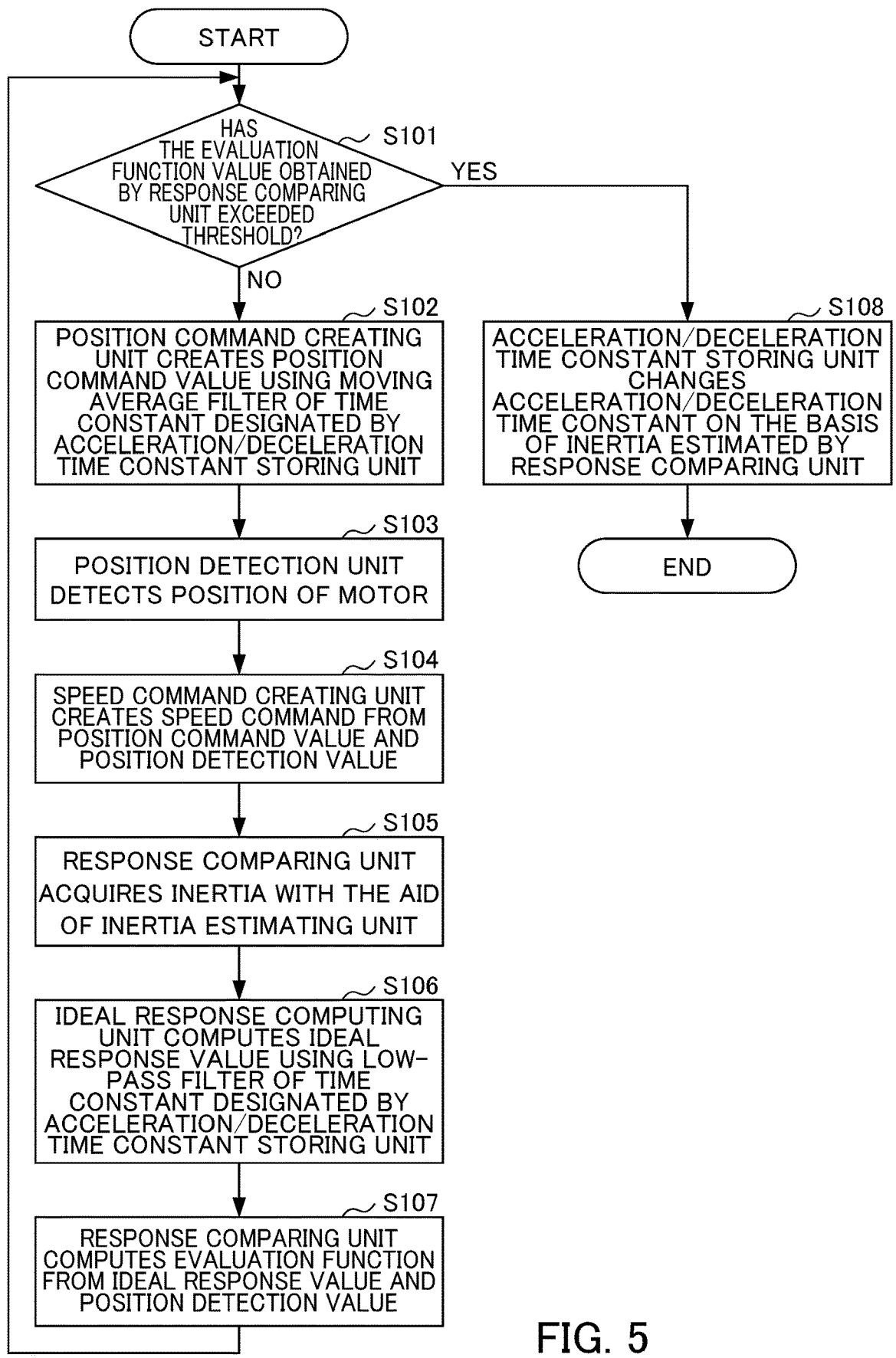
FIG. 5 is a flowchart of an adjusting process of the acceleration/deceleration time constant based on response comparison by a controller of the present embodiment.

FIG. 5 is a flowchart of an adjusting process of the acceleration/deceleration time constant by the controller 2 of the present embodiment comparing responses. First, the response comparing unit 45 determines whether an evaluation function value exceeds a threshold (step S101). When the evaluation function value is within the threshold, the flow proceeds to a processing of creating a position command value of step S102.

In step S102, the position command creating unit 42 creates a position command value using a moving average filter of the acceleration/deceleration time constant (the time constant) designated by the acceleration/deceleration time constant storing unit 41 (step S102), and the position detection unit 12 detects the position of the motor 10 (step S103). Subsequently, the speed command creating unit 43 creates the speed command based on the position command value and the position detection value (step S104).

The response comparing unit 45 acquires an inertia with the aid of the inertia estimating unit 22 (step S105). Moreover, the ideal response computing unit 44 computes an ideal response value with the aid of the low-pass filter 17 of the acceleration/deceleration time constant designated by the acceleration/deceleration time constant storing unit 41 (step S106).

The response comparing unit 45 computes an evaluation function from the ideal response value and the position detection value (step S107) and the flow returns to the response comparison and determining process of step S101. The processing of steps S101 to S107 are repeatedly performed until the evaluation function value deviates from the threshold.

If the evaluation function value exceeds the threshold in the response comparison and determination processing of step S101, the flow proceeds to an acceleration/deceleration time constant changing process of step S108. In the step S108, the acceleration/deceleration time constant storing unit 41 changes the acceleration/deceleration time constant based on the estimated inertia estimated by the response comparing unit 45.

According to the above-described embodiment, the following advantages are obtained. The controller 2 of the motor 10 that drives the work W includes: the acceleration/deceleration time constant storing unit 41 that stores an acceleration/deceleration time constant that designates the acceleration/deceleration of the motor 10; the position command creating unit 42 that creates the position command value on the basis of the acceleration/deceleration time constant; the position detection unit 12 that detects a rotation position of the motor 10; the speed command creating unit 43 that creates a speed command of the motor 10 on the basis of the position command value and the position detection value detected by the position detection unit 12; the ideal response computing unit 44 that computes an ideal response from the position command value with the aid of the low-pass filter 17; and the response comparing unit 45 that compares the ideal response with an actual response detected by the position detection unit, wherein the response comparing unit 45 changes the acceleration/deceleration time constant to be stored in the acceleration/deceleration time constant storing unit 41 when it is determined that the ideal response does not match the actual response.

In this way, it is determined whether or not the acceleration/deceleration time constant determined based on the loading capacity is appropriate, and the time constant is calibrated. Therefore, it is possible to realize both the improvement of machining efficiency and the securing of control safety. Moreover, by providing a mechanism for measuring inertia, it is possible to appropriately predict the acceleration within a control system and to make the operation identical to a physical operation that is really probable, and thus to verify the acceleration (the acceleration/deceleration time constant) with high accuracy.

In the present embodiment, the response comparing unit 45 estimates the inertia and changes the acceleration/deceleration time constant based on the estimated result. In this way, it is possible to reflect the inertia in the acceleration/deceleration time constant.

In the present embodiment, the response comparing unit 45 computes integral values of values obtained by calculating an error in a time-series signal of the response, an absolute value thereof, or a square value thereof, and performs response comparison based on an evaluation value obtained based on the integral values or a combination thereof. In this way, it is possible to perform the response comparison determining processing using the evaluation value with high accuracy.

In the present embodiment, the response comparing unit 45 determines that the comparison result is a mismatch when the evaluation value exceeds a threshold set thereto. In this way, the determination criterion is provided with a certain margin. Therefore, it is possible to prevent occurrence of cases where the results are unnecessarily determined to be a mismatch while maintaining accuracy of the response comparison determination.

While a preferred embodiment of the present invention has been described above, the present invention is not limited to the above-described embodiment and may be changed appropriately.

EXPLANATION OF REFERENCE NUMERALS

W: Work
2: Controller
10: Motor
17: Low-pass filter
22: Inertia estimating unit
41: Acceleration/deceleration time constant storing unit
42: Position command creating unit
43: Speed command creating unit
44: Ideal response computing unit
45: Response comparing unit

What is claimed is:

1. A controller of a motor that drives a driven body, the controller comprising:
an acceleration/deceleration time constant storing unit that stores an acceleration/deceleration time constant that designates an acceleration or deceleration of the motor;
a position command creating unit that creates a position command value based on the acceleration/deceleration time constant;
a position detection unit that detects a rotation position of the motor;
a speed command creating unit that creates a speed command for the motor based on the position command value and a position detection value detected by the position detection unit;
an ideal response computing unit that computes an ideal response from the position command value by utilizing a low-pass filter to add a delay of the controller to the position command value; and
a response comparing unit that compares the ideal response with an actual response detected by the position detection unit, wherein the response comparing unit estimates an inertia and changes the acceleration/deceleration time constant stored in the acceleration/deceleration time constant storing unit when it is determined that the ideal response does not match the actual response.

2. The controller according to claim 1, wherein the response comparing unit computes integral values of values obtained by calculating an error in a time-series signal of the response, an absolute value thereof, or a square value thereof, and performs response comparison based on an evaluation value obtained based on the integral values or a combination of the integral values.

3. The controller according to claim 2, wherein the response comparing unit determines that the comparison result is a mismatch when the evaluation value exceeds a set threshold.

* * * * *